Oct. 14, 1958 — I. ANOP — 2,856,037
AUTOMATIC BRAKE ADJUSTMENT DEVICE
Filed June 17, 1953 — 2 Sheets-Sheet 1
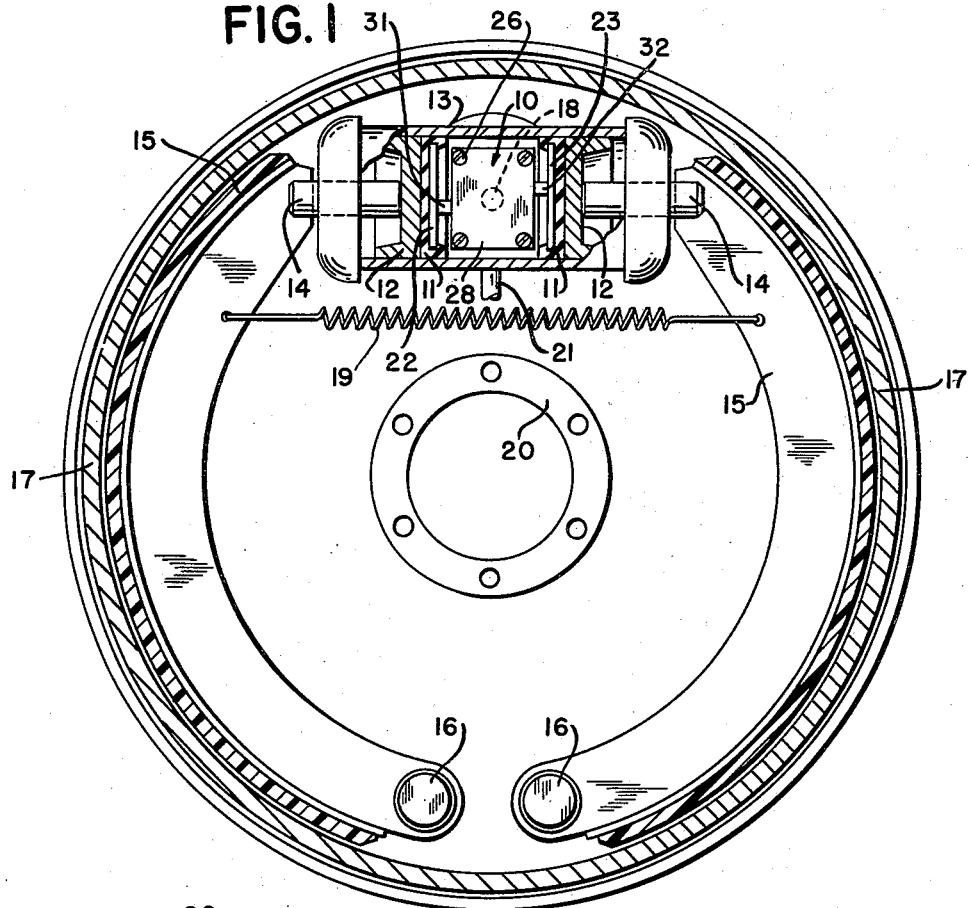
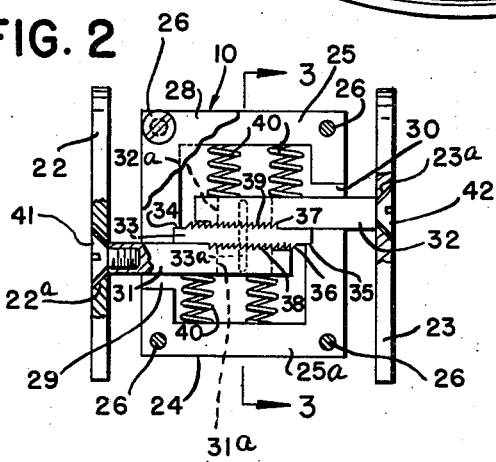
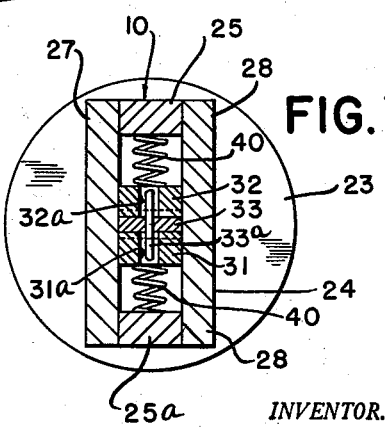
INVENTOR.
IVAN ANOP
BY J. William Freeman
ATTORNEY Oct. 14, 1958     I. ANOP     2,856,037
AUTOMATIC BRAKE ADJUSTMENT DEVICE
Filed June 17, 1953     2 Sheets-Sheet 2
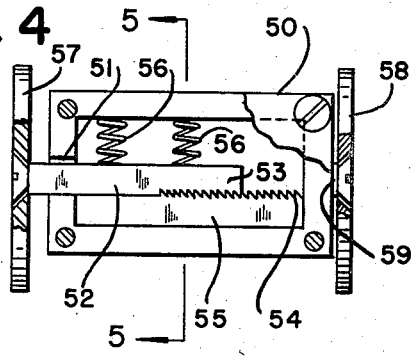
FIG. 4
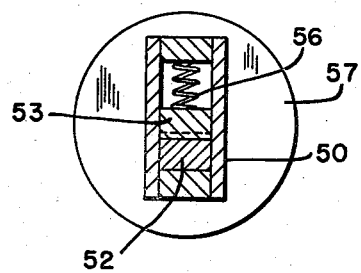
FIG. 5
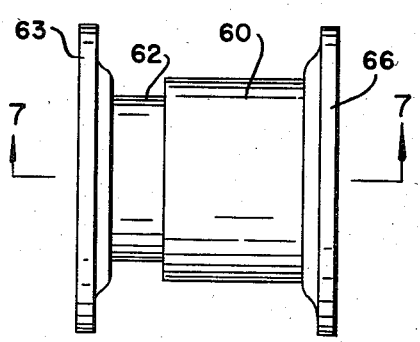
FIG. 6
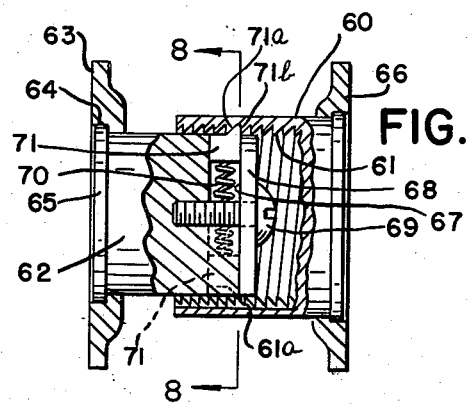
FIG. 7
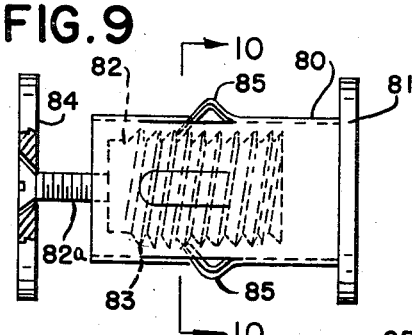
FIG. 9
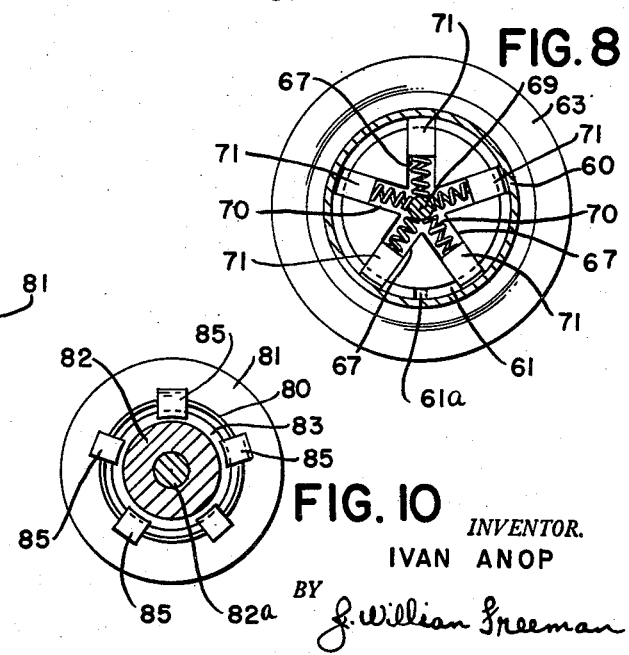
FIG. 8
FIG. 10
INVENTOR.
IVAN ANOP
BY J. William Freeman
ATTORNEY

United States Patent Office 2,856,037
Patented Oct. 14, 1958

2,856,037

AUTOMATIC BRAKE ADJUSTMENT DEVICE

Ivan Anop, Barberton, Ohio

Application June 17, 1953, Serial No. 362,237

13 Claims. (Cl. 188—196)

This invention relates to hydraulic brake systems for automobiles and the like and in particular relates to an improved brake adjustment mechanism, capable of incorporation within the conventional brake cylinder to automatically compensate for wear of the brake lining.

In the conventional hydraulic braking system of an automobile, a pair of brake shoes are pivoted into engagement with the brake drum to effectuate requisite braking action by virtue of the pressure supplied from the brake cylinder. When the braking pressure is released, the shoes are pivotally urged out of contact with the brake drums by a spring, connecting the respective brake shoes. In the normal case, the brake cylinder is constructed to house a pair of piston seals, that are respectively adjacent to appropriate pistons, which are held in spaced relationship with respect to the entry port for the hydraulic fluid by a compression spring interposed therebetween. The improved automatic brake adjuster forming the basis for this invention is intended to replace the above compression spring, both in structure and function.

Up to the present time, numerous attempts have been made in the prior art to automatically compensate for the wear in brake linings. Without exception, the various patentees have resorted to modification of either the conventional brake system or the conventional brake cylinder. Further, these efforts have been invariably directed toward the modification of the exterior piston connection between the brake cylinder and the brake shoe. This has been, of necessity, dictated by the inability of incorporating the concepts advanced, interiorly of the brake cylinder, due to interference with the entry of the hydraulic fluid through the conventional port of entry.

It is therefore one object of this invention to provide an automatic brake adjustment device capable of operation between the conventional piston seals of an automobile brake cylinder, to automatically compensate for the wear in brake lining.

It is a further object of this invention to provide an automatic brake adjustment device that can be incorporated within a conventional brake cylinder without modification of the same.

It is a further object of this invention to provide a relatively inexpensive, brake adjustment device of simplified construction, capable of utilization between the conventional piston seals of a brake cylinder without interfering with the entry of hydraulic braking fluid through the conventional port of entry.

These and other objects of the invention will become more apparent upon reading of the following specification considered in the light of the accompanying drawings.

In the drawings:

Figure 1 is a side elevation, partly broken away and in section, and illustrating the improved automatic brake adjustment device incorporated in the conventional hydraulic brake system of an automobile.

Figure 2 is an enlarged side elevation, partly broken away and in section, and illustrating the construction of the preferred form of automatic brake adjustment device per se.

Figure 3 is a section taken on the lines 3—3 of Figure 2.

Figure 4 is a side elevation, partly broken away and in section and illustrating a modified form of the invention.

Figure 5 is a section taken on the lines 5—5 of Figure 4.

Figures 6, 7, and 8, are views illustrating another modification of the invention.

Figures 9 and 10 are views illustrating a still further modification of the invention.

Referring now to the drawings, and in particular to Figure 1 thereof, the automatic brake adjustment device, generally indicated as 10, is shown interposed between piston seals 11, 11, and metallic piston heads 12, 12, backed thereto and provided within a brake cylinder 13, the opposed piston rods 14, 14, of which are secured in the usual manner to a pair of brake shoes 15, 15, that are in turn pivoted about pivot pins 16, 16, for braking engagement with a relatively rotatable brake drum 17. As in the known prior art, braking action results from the introduction of a hydraulic fluid into the brake cylinder 13, through an entry port 18, the usual arrangement being such that the fluid, being under pressure, exerts force on the piston seals 11, 11, to cause the same to move relatively apart, resulting in pivoting of the brake shoes 15, 15, into braking engagement with the relatively rotatable braking drum 17. Release of the braking pressure results in return of the brake shoes 15, 15, to the position of Figure 1, due to the tensional force exerted thereon by the spring 19. A backing plate 20, designed for mounting on the axle (not shown), and a fluid conduit 21 for transporting the hydraulic fluid to the cylinder 13, are provided for use in a manner well known in the prior art.

Referring now to Figures 2 and 3 of the drawings for a detailed description of brake adjustment mechanism 10 per se, the same is shown including a pair of spaced piston heads 22, 23, designed for reception within the piston seals 11, 11 (see Figure 1) and being capable of respective movement away from an intermediate housing 24 containing the adjustment mechanism. To this end, the housing 24 includes a pair of substantially J shaped members 25, 25a, secured, as by screws 26, 26, between a pair of cover plates 27, 28, so as to form a substantially rectangular enclosure having openings 29, 30, defined by the members 25, 25a.

For the purpose of imparting a relatively fine degree of adjustment with respect to the lateral outward movement of the piston heads 22, 23, the adjustment mechanism contemplates the utilization of relative movement between; (1) a pair of movable piston rods 31, 32, that are extendable through the openings 29, 30 for respective attachment to the piston heads 22, 23; and (2) a fixed cross-piece 33 having the opposed ends thereof received within appropriate undercut portions 34, 35. (See Figure 2.) While the fluid pressure against the piston heads 22, 23 initiates the foregoing relative movement, restriction of this movement, is accomplished by virtue of engagement between a plurality of serrations provided between the cross piece 33, and the relatively movable piston rods 31, 32. To this end, the cross piece 33 has serrations 36, 37, provided on the opposed faces thereof, and designed for cooperative reception with correspondingly formed serrations 38 and 39, that are provided on the piston rods 31 and 32, respectively.

Because the operation of the adjustment mechanism is predicated upon the advancement of the serrations 38 and 39, with respect to the relatively fixed serrations 36 and 37, respectively, it is manifest that these above referred to serrations must be maintained in engagement at all times. To this end, a plurality of coil springs 40, 40 are interposed between one face of the members 25, 25a and one face of the piston rods 31, 32, respectively, the arrangement being such that the springs 40, 40 continually urge the piston rods 31, 32 away from the members 25, 25a whereby the serrations 36 and 37 of the cross piece 33 may be meshed with the serrations 38 and 39, respectively of the piston rods 31, 32. (See Figure 2.)

To insure equidistant lateral movement of the piston rods 31, 32 with respect to the cross piece 33, the latter is shown including a pin 33a, provided adjacent the central portion thereof, and having the opposed ends thereof freely receivable within slots 31a, 32a, that are provided in the piston rods 31, 32. In this manner when the piston rod 32 moves to the right (Figure 2) under the influence of hydraulic pressure exerted on the disc 23, the pin 33a will ultimately contact one end wall of the slot 32a and further outward movement of the piston 32 will be obviated, whereby the piston rod 31 will move to the left (Figure 2), until the pin 33a engages one end wall of the slot 31a, thus limiting the outward movement in the manner previously described. To permit further outward movement of the piston heads 22, 23 under extreme conditions, the pin 33a may be designed to shear upon the application of extreme pressure. Similarly, other means, such as a spider mount or an apertured rubber connection, may be employed to obviate the relative movement between the housing 24 and the cylinder 13.

To compensate for the requisite clearance required between the lining of the brake shoe and the brake drum, the piston heads 22, 23 are shown mounted on the piston rods 31 and 32, in loosely fitting relationship, the same being shown accomplished by provision of oversized, chamfered apertures 22a, 23a, in the piston heads 22, 23, designed for permitting loose reception of the piston heads 22, 23 around stove bolts 41, 42, that are threaded into the piston rods 31, 32, respectively, in known manner. By like token, the apertures 22a, 23a may be located eccentrically of the piston heads 22, 23 to permit the peripheral portions of the piston heads 22, 23 to be aligned with each other, even though the same are mounted on the piston rods 31, 32, that are offset axially with respect to each other. It will be seen that the connection with the piston seals 11, 11, will serve to obviate any lateral movement of the piston heads 22, 23, towards each other.

In use or operation of the improved automatic brake adjustment device 10, the conventional brake cylinder is first disassembled, and the conventional spring (not shown) that is interposed between the piston seals 11, 11, is removed and discarded. The piston seals 11, 11 are then secured to the piston heads 22, 23 of the device 10, as by an adhesive or threaded connection, or if more desirable, specially formed sealing discs, of the type employed in Figure 1, having annular undercuts, for snug reception therein of the peripheral portions of the piston heads 22, 23, may be employed to maintain the connection between piston 11, 11 and the piston heads 22, 23 respectively. With the piston seals 11, 11 thus secured to the piston heads 22, 23 of the device 10, the completed assembly is then inserted within the cylinder 13, whereupon the metallic piston heads 12, 12 are replaced, and the piston rods 14, 14 are secured to the brake shoes 15, 15, to complete the installation of the device in the braking system as shown in Figure 1.

With the unit 10 thus assembled in the braking mechanism and ready for operation, exertion of foot pressure on the brake pedal (not shown), will result in hydraulic pressure being applied internally of the cylinder 13 with a resultant outward movement of piston seals 11, 11, metallic piston heads 12, 12, and piston rods 14, 14, to cause pivoting of the brake shoes 15, 15 about the pivot points 16, 16, thus causing the brake lining to engage the brake drum 17 and effectuate braking action. Release of the foot pressure will simultaneously cause a release of the hydraulic pressure with the result that the spring 19 will return the piston seals 11, 11, metallic piston heads 12, 12, piston rods 14, 14, and shoes 15, 15 to the position of Figure 1. The foregoing is descriptive of the operation of the braking mechanism during the initial period of operation when the lining is new, and during this period, the device 10 merely operates to keep the piston seals 11, 11 in spaced relationship about the port 18, much in the same manner as the conventional spring normally employed. As previously described, the clearance between the piston heads 22, 23 and the stove bolts 41, 42 permits the advancement of the brake shoes 15, 15, into contact with the brake drum 17 without lateral movement of the piston rods 31, 32 during this initial period.

As the lining begins to wear due to repeated braking action incident to normal travel, the lateral displacement of the piston heads 22 and 23 will gradually increase due to the increased travel necessary to engage the shoes 15, 15 with drum 17. As this amount of lateral displacement increases to the point where the same exceeds the previously described clearance, the pressure on the respective piston heads 22, 23 (secured to sealing piston seals 11, 11) will exceed the force of the springs 40 with the result that the serrations 38 and 39, of the piston rods 31 and 32 respectively will advance over one inclined serrated edge portion of the serrations 36, 37 provided on the cross piece 33. Subsequent wear will result in similar advancements over the respective serrations until the piston rods 31 and 32 have reached the outward extent of thus lateral displacement as controlled by the pin 33a riding within slots 31a, 32a as previously described. Further pressure will result in shearing of the pin 33a provided that the same is of the shear type. When this point is reached, the operator will be apprised thereof by virtue of the decreased pressure available to the user. As a result of this decreased pressure, it will be necessary to depress the brake pedal a greater distance in order to properly brake the car, and the driver will thus be given adequate notice that the brake shoes require relining. Prior to worn-out condition described above the braking action will be maintained uniform at all times. It should be noted that while the piston rods 31 and 32 may advance outwardly with respect to the housing 24, inward movement from the extended positions will not be permitted due to structure of the respective serrations which are shown made up of an inclined face and a perpendicular face. Thus, the mating serrations will slide over the inclined faces and be locked with respect to the perpendicular faces. Satisfactory results have been obtained by employing serrations having their peaks approximately .025 inch apart, although it is manifest that this dimension may be varied in accordance with the degree of adjustment required.

It will be seen from the foregoing that a simple, relatively inexpensive, device has been provided for eliminating the usual brake adjustments required during the normal life of brake linings. It has also been shown how the foregoing device can be utilized in conventional braking systems without modification thereof.

In Figures 4 to 10 inclusive, various modifications of the device are illustrated. In each case, the modified device is capable of utilization interiorally of the cylinder 13 (Figure 1) and accordingly like numerals indicate like parts.

Accordingly, in Figures 4 and 5, the modified form of automatic brake adjustment shown therein contemplates use of a rectangular housing 50, having a side opening 51, for reception therethrough of a piston rod 52, which is designed for relative outward movement with respect to the housing 50. As before, this relative movement is controlled by the provision of cooperating serrations 53, 54, provided on the piston rod 52 and a relatively stationary cross piece 55, respectively, and being held in meshing engagement with each other by springs 56, 56. (See Figure 4.) As before, clearance is provided between the piston rod 52, and a piston head 57 that is loosely mounted on the freely extended end of the piston rod 52. A second disc, 58, corresponding in size to piston head 57 stationary with respect to the housing 50, is mounted loosely on a shaft 59 provided on the opposite side of the housing in similar manner to provide lateral clearance. For the purpose of preventing lateral shifting of the housing 50 with respect to the cylinder 13, the same may be provided with a surrounding spider (not shown) secured thereto, and having the peripheral portions thereof secured to the internal wall of the cylinder 13. Similar securing devices of rubber may be employed in connection with all modifications of the invention.

The operation of the modified form of the invention shown in Figures 4 and 5 is substantially similar to the operation described in connection with Figures 1 to 3 inclusive, with the single exception that only one piston head (57) is capable of any continual degree of outward lateral displacement with respect to the housing 50. As before, advancement of the serrations 53, 54 with respect to each other, in response to the pressure exerted on piston head 57, accounts for this lateral displacement, and movement from the extended position is not permitted.

While the modified form of the invention shown in Figures 6, 7 and 8 is designed for similar application interiorly of the cylinder 13 (Figure 1), the method of effectuating the adjustment in this form of the invention varies from that previously described. Accordingly, a cylindrically shaped housing 60, provided with internal threads 61, is shown receiving a correspondingly shaped piston rod member 62, designed for relative movement therewith and being provided with a piston head 63 thereon, that is capable of limited lateral movement with respect to the piston rod 62 by virtue of an oversized undercut 64, provided on the piston head 63 for reception over a rib 65 of the piston rod 62. Similar clearance is provided on a disc 66, that is mounted in like manner on the exterior of the cylindrical housing 60. (See Figure 7.) For the purpose of controlling the relative movement between the housing 60 and the piston rod 62, that is initiated by virtue of pressure influence against the piston head 63 and disc 66, the piston rod 62 is provided with a plurality of radially extending rabbets 67, 67 at one end thereof, the same being shown enclosed by virtue application of a cylindrical plate 68, secured to one end of the piston rod 62 as by a bolt 69. Receivable within the enclosed rabbets 67, 67, and being supported by the external periphery of the bolt 69, are a plurality of springs 70, 70, that operate to urge a like number of pawls 71, 71 into engagement with the internal threads 61 of the cylindrical housing. To obviate the possibility of a pressure lock formed by virtue of the entrapped fluid within the housing 60, the internal threads 61 are provided with a longitudinally extending rabbet 61a, designed to permit passage of brake fluid, but being smaller than the pawls 71, 71. While the pitch of the threads 61 remains constant, it is manifest that the radial dimension, between the axis of the housing 60 and the threads 61 will vary in a plane normal to the axis, due to the axial advancement of the thread's pitch in known manner. Thus each of the pawls 71, 71, having their faces aligned in a plane normal to the axis of the housing 60, will be engaged to a different extent with the threads 61. (See Figure 7.) This permits each pawl 71 to separately advance over a peak of the threads 61 upon the application of the requisite axial force against the piston head 63, and the disc 66 as described.

In operation, the piston head 63 and disc 66 will be secured with respect to the piston seals 11, 11 as before (see Figure 1), and during the initial operation no outward movement of the piston rod 62 will occur with respect to the housing 60 due to the play or clearance that is built into the piston head 63 and disc 66 as previously described. However, when the axial force of the piston rod 62 exceeds the clearance, one pawl 71 will be forced radially inwardly in the surrounding rabbet 67, against the force of the spring 70 and will thus advance over one peak of the threads 61. During this advance, each of the remaining pawls 71, 71 will be slightly depressed to approach the point of axial displacement where the same will successively pass a peak of the threads 61, thus permitting very fine adjustment of the axial movement of the piston rod 62 with respect to the housing 60. As before, movement of the piston head 63 and disc 66 towards each other is prevented by the construction of the pawls 71, 71, which are shown including inclined faces 71a, 71a, and relatively perpendicular faces 71b, 71b (see Figure 7).

Referring now to Figures 9 and 10, the modified form of the invention shown therein contemplates employment of a cylindrical housing 80, having a disc 81 mounted thereon in the manner previously described in conjunction with the disc 66 of Figures 6, 7, and 8, so as to provide a limited amount of lateral movement for the purpose of providing clearance. Receivable in relatively movable relation within a portion of the housing 80, is shown a correspondingly shaped piston rod 82, having externally presented threads 83, and having a bolt 82a extending outwardly from the free end thereof, for reception of a piston head 84, mounted thereon in the manner described in connection with Figures 1, 2, and 3. For the purpose of controlling the relative movement between the piston rod 82 and the housing 80, the latter (housing 80) is shown including a plurality of radially inwardly bent tines 85, 85, designed for tensional reception against the threads 83. In this manner, as axial movement of the piston rod 82 occurs, one tine 85 will be advanced over a peak of the threads 83, and the remaining tines 85, 85 will be successively advanced towards the point of passing a peak of the thread 83. As is the case in conjunction with the device shown in Figures 6, 7, and 8, axial advancement of the piston 82 is not predicated upon the rotational movement of the same, and similarly the piston cannot return from its advanced position because of the structure of the advancing mechanism, which permits relative movement, in one direction only, between the piston rod 82, and the housing 80.

As previously stated, the foregoing modifications are all capable of utilization interiorly of the conventional brake cylinder without the need for modifying the same in any manner. Accordingly, similar modifications may be resorted to without departing from the spirit thereof of the scope of the appended claims.

What is claimed is:

1. A brake adjustment device, capable of utilization between the shiftable spaced sealing discs that are provided interiorly of the conventional dual piston type brake cylinder of an automobile hydraulic brake system, comprising a cylindrical housing; a first pressure-responsive plate carried by said housing externally thereof and being capable of being secured to one of said sealing discs; a cylindrical piston rod having an axial length thereof received interiorly of said housing and being axially shiftable with respect thereto; a second pressure-responsive plate capable of being secured to the remaining sealing disc and being carried by the projecting free end of said piston rod exteriorly of said housing so as to be movable therewith relatively of said first-named pressure-responsive plate; and means operable between said piston and said housing to regulate the relative movement therebetween.

2. A brake adjustment device capable of utilization between the spaced sealing discs that are provided interiorly of the brake cylinder of an automobile hydraulic brake system, comprising: an interiorly threaded cylindrical housing; a pressure-responsive plate carried exteriorly of said housing at one axial end thereof and being capable of being secured to one said sealing disc; a cylindrical piston rod having an axial length thereof concentrically telescoped interiorly of said housing, and including at least one radially extending slot; a second pressure-responsive plate secured to the projecting end of said piston rod and being capable of movement therewith; and means operable between said piston and said housing to regulate the relative movement therebetween; said means including at least one pawl member slidingly received within said radial slot, and at least one spring member also received in said slot whereby said pawl is normally urged radially outward by said spring into contact with said internal threads.

3. A brake adjustment device capable of utilization between the spaced sealing discs that are provided interiorly of the brake cylinder of an automobile hydraulic brake system, comprising: a cylindrical housing having at least one tine member tensionally projected radially inwardly thereof; a pressure-responsive plate secured exteriorly of said cylinder at one projecting axial end thereof and being capable of being secured to one of said sealing discs; a piston rod having an axial length thereof concentrically telescoped interiorly of said housing and being externally threaded; a second pressure-responsive plate secured to said piston and being capable of being secured to the remaining sealing disc for movement therewith; and means operable between said piston rod and said housing to regulate the relative movement therebetween; said means including tensional engagement of said tine with said externally threaded piston rod.

4. An hydraulic brake cylinder for use with a pair of pivoted brake shoes that have replaceable linings that are engageable with a relatively rotatable brake drum, comprising: a cylindrical member having a port of entry for hydraulic fluid adjacent the central portion thereof; a pair of piston seals axially moveable in sealing relationship with respect to the internal wall of said cylinder and being spaced on opposite sides of said port of entry; a pair of link arms, each interconnecting one said seal with one brake shoe whereby said seals move axially of said cylinder upon pivoting of said brake shoes; and adjustment means disposed internally of said cylinder and including a housing disposed adjacent said port of entry and having opposed pressure-responsive piston heads that are movable relatively of each other and said housing; said piston heads being secured to said seals of said port of entry to said seals; and means for axially expanding and contracting said adjustment means whereby the distance between said seals may be regulated, said housing being less in transverse dimension than said heads.

5. A brake adjustment device capable of utilization between the shiftable spaced sealing discs that are provided interiorly of the conventional dual piston type brake cylinder of an automobile hydraulic brake system, comprising; a housing received interiorly of said cylinder; a pair of piston rods carried by said housing and projecting therefrom with at least one said piston rod being relatively movable with respect to said housing; a pair of pressure-responsive piston heads each shiftably carried on the freely presented ends of said piston rods and being capable of being respectively secured to said sealing discs externally of said housing; and means operable between said housing and said piston rods to regulate the relative movement therebetween that is initiated by the application of axial pressure between said pressure-responsive plates.

6. A brake adjustment device capable of utilization between the shiftable spaced sealing discs that are provided interiorly of the conventional dual piston type brake cylinder of an automobile hydraulic brake system, comprising a housing received interiorly of said cylinder; a member fixed with respect to said housing; a pair of piston rods carried by said housing and projecting therefrom with at least one said piston rod being relatively movable with respect to said housing; a pair of pressure-responsive piston heads each shiftably carried on the freely presented ends of said piston rods and being capable of being respectively secured to said sealing discs externally of said housing; and means operable between said housing and said piston rods to regulate the relative movement therebetween that is initiated by the application of axial pressure between said pressure-responsive plates; said means including meshing serrations provided between each of said piston rods and the opposed faces of said member, and a plurality of springs operable between said housing and said piston rods to urge the respective serrations thereof into meshing engagement with said serrations provided on the opposed faces of said member that is fixed with respect to said housing.

7. A brake adjustment device of the character described, comprising: a hollow housing having internal walls; a member fixed to one said wall; a piston rod having an axial length thereof cooperatively received interiorly of said housing for relative movement therewith; a pressure-responsive piston head secured to the projecting end of said piston rod; and means operable between said internal walls of said housing and said piston rod received therein for control of the axial movement of said piston rod relatively of said housing; said means including a plurality of serrations provided on said member that is fixed with respect to said housing; a second set of complemental serrations provided on said piston rod and being meshed with said first-named set of serrations; and spring means positioned under compression between one said internal wall of said housing and said piston rod contained therein to normally maintain said serrations in meshing engagement with each other.

8. A brake adjustment device of the character described, comprising; a housing having opposed ends; a piston rod carried by said housing and projecting from one opposed end thereof; a first piston head mounted on the projecting end of said piston rod; a second piston head carried by said remaining opposed end of said housing in shiftable relationship therewith and in concentricity with said first piston head; said first and second piston heads being of substantially equal diameter; and means for moving said piston rod relatively of said housing whereby said first piston head will shift away from said housing and said second piston head.

9. The device of claim 8 further characterized by the fact that said first and second piston heads are provided with sealing members that are releasably associated therewith.

10. The device of claim 8 further characterized by the fact that said means includes complemental serrations carried by said housing and said piston rod and are maintained in meshing relationship with each other.

11. The device of claim 10 further characterized by the fact that the amount of movement of said piston rod with respect to said housing is limited.

12. The device of claim 8 further characterized by the fact that the amount of movement of said piston rod relatively of said housing is limited.

13. An adjustable brake mechanism of the character described, comprising; a brake cylinder having opposed axial ends and an intermediate fluid entry port; a housing received interiorly of said cylinder and having opposed ends; a piston rod carried by said housing and projecting from one opposed end thereof; a first piston head mounted on the projecting end of said piston rod; a second piston head carried by said remaining opposed end of said housing in shiftable relationship therewith and in concentricity with said first piston head; said first and second piston heads being of substantially equal diameter and being disposed on opposite sides of said fluid entry port; a pair of sealing elements secured to said first and second piston heads and being engageable with the internal surface of said cylinder on opposed sides of said fluid entry port; and means for moving said piston rod relatively of said housing upon application of fluid pressure through said fluid entry port; each said piston head and each said sealing means carried therebetween being movable relatively of said cylinder upon application of said fluid pressure.

References Cited in the file of this patent

UNITED STATES PATENTS

| | | |
|---|---|---|
| 1,668,730 | Pearson | May 8, 1928 |
| 2,100,488 | Rasmussen | Nov. 30, 1937 |
| 2,175,446 | Rasmussen et al. | Oct. 10, 1939 |
| 2,404,326 | Taylor | July 16, 1946 |
| 2,554,291 | Bradley et al. | May 22, 1951 |
| 2,736,396 | Rasmussen et al. | Feb. 28, 1956 |

FOREIGN PATENTS

| | | |
|---|---|---|
| 610,413 | France | June 7, 1926 |